Figure 1:
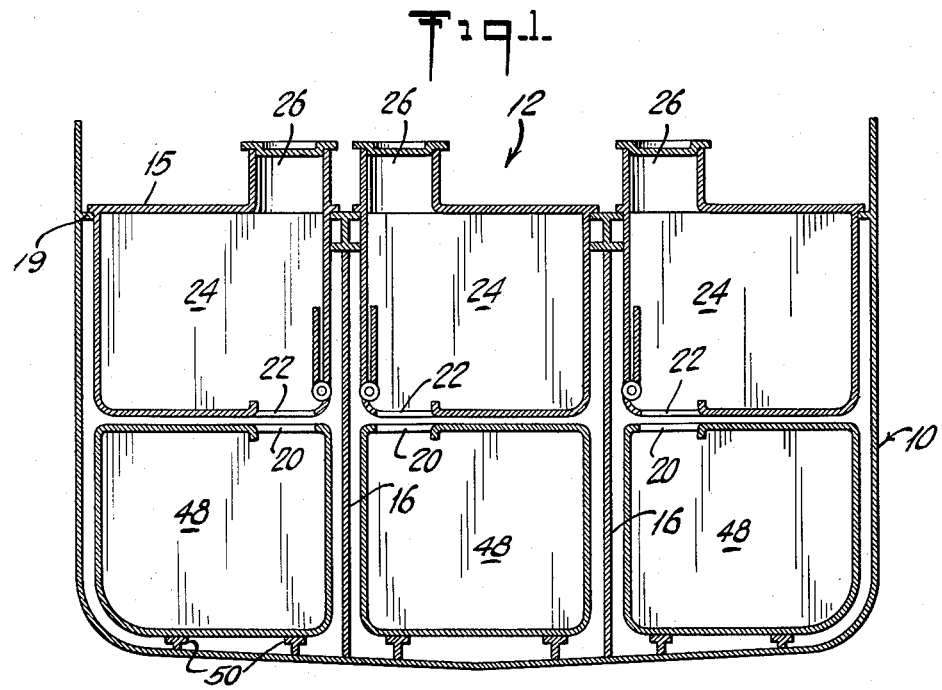

Oct. 10, 1961 — W. SÄNGERLAUB — 3,003,452
FISHING VESSEL
Filed April 20, 1959

INVENTOR
WILHELM SÄNGERLAUB

3,003,452
FISHING VESSEL
Wilhelm Sängerlaub, Rostock, Germany, assignor to VEB Volkswerft Stralsund, Stralsund, Germany
Filed Apr. 20, 1959, Ser. No. 807,494
1 Claim. (Cl. 114—72)

This invention relates in general to ship construction and in particular to a new and useful ship construction including a loading area subdivided by partitions and bulkheads to receive a plurality of removable tanks therein.

The present invention is particularly concerned with the construction of loading spaces for fishing vessels having an arrangement which permits quick unloading thereon.

It has been found with the usual fishing vessel construction that a great deal of difficulty is encountered and time consumed in the transferring of fish catches from small vessels to the larger vessel for return of the catch to the market. In addition, if the fish are transferred in small containers or open nets, damage to the catch is likely. With the fishing vessels in present use it is not possible to transfer the catch to the parent vessel without injury to the fish, and without expending a great deal of time both on behalf of the parent vessel and the fishing vessel.

The above mentioned shortcomings are eliminated by the use of fishing vessels according to the invention. The fish chambers of the catching vessels are designed as exchangeable large tanks and can be taken over by the parent vessel or the land plant and emptied by tilting.

It is advisable to design the fish chambers of the fishing vessel (hereafter called change tanks) with equal outside dimensions, so that emptied and cleaned change tanks, provided with refrigerating means, if necessary, can be inserted immediately.

The change tanks can be very large so that only a few operations are necessary for unloading of the entire catch and inserting the empty tanks. The time required up to now for the unloading and new equipment of the fishing vessel is thus reduced from days to less than one hour.

The use of the change tanks permits a greater subdivision of the hull of the fishing vessel than it was customary up to now by additional transverse and longitudinal bulkheads, so that the safety of the vessel is increased.

The change tanks are inserted in large deck openings. They can be provided with a packing collar for easy handling and removal. When installed in the vessel they take over the function on the deck as a packing member and working place for the sorting and first processing of the catch. The deck openings are formed by cross beams and longitudinal girders which have the function on the deck as a strengthening unit.

Another advantage results from the fact that the bottom and wall heat insulation does not have to contact the load. Only the top insulation is made part of the change tanks which also double as the deck.

For large trawlers a further subdivision would be advisable to avoid too high single weights of the change tanks. For this reason three to four deck ports can be provided side by side and at the same time two change tanks each arranged one above the other.

In order to avoid unequal room dimensions the lower lateral change tanks can be omitted altogether or only for the front zone of the fish space in the case of narrow spars. They can be replaced by tanks for fuel and water.

The charging of the lower change tanks can be effected through the superposed tanks by means of a closable port provided in the bottom.

The inner division of the change tanks can correspond to the conditions determined by the types of fish. While no subdivision into smaller units is necessary for accessory catch and waste, sensitive fish types require lower decks, and longitudinal and cross partitions inside the change chambers.

In order to ensure the emptying of the change tanks by simple tilting, the charge hatch must be arranged eccentrically on the longitudinal wall.

Accordingly it is an object of this invention to provide fishing vessels having means for subdividing the vessels to receive removable change tanks.

A further object of the invention is to provide a vessel construction including a cargo space subdivided by bulkheads to receive a plurality of tanks therein.

A further object is to provide an improved removable tank construction for a vessel.

For a better understanding of the invention, its operating advantages and specific objects attached by its use, reference should be had to the accompanying drawing and descriptive matter in which there is illustrated and described preferred embodiments of the invention.

In the drawings:
FIG. 1 is a transverse section of a large fishing trawler with change tanks and cargo space constructed in accordance with the invention; and
FIG. 2 is a section similar to FIG. 1 of a trawler having a sharply curved hull.

Figure 2:
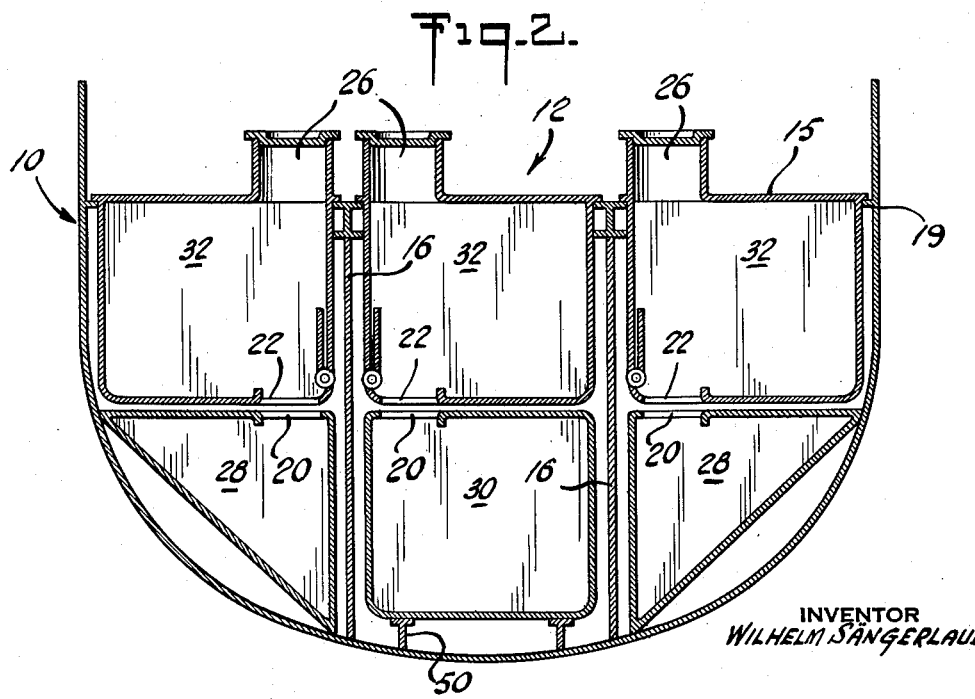

Referring to FIGURES 1 and 2 in particular, the invention as embodied therein includes large-size fishing vessels generally designated 10 having central cargo areas 12 which are subdivided by a plurality of transverse bulkheads (not shown), and one or more longitudinal bulkheads 16, to form substantially rectangular compartments to receive a plurality of individual change tanks to be described in more detail hereunder.

The deck may be provided with cross beams spaced apart sufficiently to form tank supporting surfaces along with the tops of longitudinal girders 19. The deck beams, the longitudinal girders and the transverse bulkheads are used with considerable reinforcing members for transmitting the loads uniformly throughout the deck construction to the bottom construction of the vessel.

In FIGURES 1 and 2 there are illustrated large trawling vessels which are large enough to receive a plurality of change tanks. The change tanks which are adapted to be fitted in the bottom of the vessel, as indicated at 48 in FIG. 1, are provided with top openings 20 located adjacent one side thereof which align with similar bottom openings 22 of upper change tanks 24 in order to permit charging of the lower tanks through the upper tanks. The upper tanks 24 are provided with fill openings 26 located to one side thereof. The openings 22 in the bottom may be either opened to charge the lower tanks 48 or closed in those cases where the tanks 48 have been charged directly or they are to be retained empty.

Since the containers are usually filled on the high seas when the parent vessel and the fishing vessel are likely to be under high stress due to the wave conditions, it is not usually desirable to weaken the parent vessel by taking out the upper containers in order to fill the lower ones. Therefore, the lower containers are filled through the upper ones and through the openings 22, which openings are thereafter closed. Thereafter, the upper tanks may be removed from the vessel, the bottom openings closed, the tanks filled with the catch from the fishing vessel, and then returned to their position on the larger vessel.

The outboard tanks are preferably shaped to conform to the configuration of the vessel hull in order to avoid wasting any cargo space. In the event that the hull of the vessel 10 is sharply curved, as is indicated in FIG. 2, dimensioned tanks 28 may be employed to substantially fill the side bottom areas. The tanks 28 in this instance are made substantially triangular in transverse section. Tanks 32 are similar to the upper tanks 24 of the first embodiment. These tanks 32 have fill openings 26 at their tops and openings 22 at their bottoms, aligned with the top openings 20 of lower tanks 28, 30. A central tank 30, similar to the tanks 48, is provided beneath the upper tanks 32.

As seen in both embodiments, the vessels 10 in accordance with the invention are subdivided into large tank receiving shaftways or compartments by the longitudinal bulkheads 16 and by cross or transverse bulkheads (not shown). In each instance the tanks 24, 48 and 28, 30, 32 are made to dimensions in which they will substantially completely fill the compartments thus defined.

The vessels advantageously include structural members such as keel beams 50 upon which are positioned the bottom tanks 48 or 30. Each of the upper tanks 24, 32 includes laterally extending flanges 15 which are adapted to rest on the top faces of longitudinal beams 19 and the cross beams (not shown). In this manner, the vessel is actually reinforced by the tank, which may in turn be advantageously subdivided by reinforcing bulkheads and deck members.

The various features of novelty which characterize the invention are pointed out with particularity in the claim annexed to and forming a part of this specification.

While a specific embodiment of the invention has been shown and described in detail to illustrate the application of the invention principles, it will be understood that the invention may be embodied otherwise without departing from such principles.

What is claimed is:

In a fishing vessel including a loading area defined by intersecting longitudinal and transverse bulkheads, the improvement comprising large-sized change tanks of a size for positioning directly in the areas defined by said bulkheads, said tanks being arranged in upper and lower relation to each other and including outwardly flanged upper portions adapted to rest on the upper edges of said bulkheads, said tanks having reinforced structural portions and top openings located adjacent one side thereof, the upper tanks having bottom openings aligned with said top openings to permit charging of the lower tanks, and hinged closure means for each of said upper tank bottom openings to close off charging of said lower tanks.

References Cited in the file of this patent

UNITED STATES PATENTS

| | | |
|---|---|---|
| 2,440,307 | Smith | Apr. 27, 1948 |
| 2,513,004 | Cooley | June 27, 1950 |

FOREIGN PATENTS

| | | |
|---|---|---|
| 58,075 | France | May 6, 1953 |
| | (Addition to No. 1,004,267) | |